(12) United States Patent
Shanmugam et al.

(10) Patent No.: US 11,816,075 B2
(45) Date of Patent: Nov. 14, 2023

(54) CONFIGURATION ENGINE FOR DYNAMICALLY GENERATING USER INTERFACES

(71) Applicant: Bank of America Corporation, Charlotte, NC (US)

(72) Inventors: Maruthi Shanmugam, McKinney, TX (US); Karen Trevino, Plano, TX (US); Smruti Soumya Mishra, Charlotte, NC (US); Nishant Shah, Charlotte, NC (US); Benjamin Moore, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 8 days.

(21) Appl. No.: 17/386,162

(22) Filed: Jul. 27, 2021

(65) Prior Publication Data

US 2023/0032457 A1    Feb. 2, 2023

(51) Int. Cl.
*G06F 16/21*   (2019.01)
*G06F 16/22*   (2019.01)
*G06F 16/242*  (2019.01)

(52) U.S. Cl.
CPC ........ *G06F 16/211* (2019.01); *G06F 16/2282* (2019.01); *G06F 16/2428* (2019.01)

(58) Field of Classification Search
CPC . G06F 16/211; G06F 16/2428; G06F 16/2282
USPC .......................................... 707/803; 715/762
See application file for complete search history.

(56) References Cited

U.S. PATENT DOCUMENTS

| 8,874,613 | B2 | 10/2014 | Gorelik et al. |
| 9,430,114 | B1* | 8/2016 | Dingman ................ G06F 16/25 |
| 9,471,711 | B2 | 10/2016 | Abadi et al. |
| 9,529,937 | B2 | 12/2016 | Britton et al. |
| 10,147,141 | B1* | 12/2018 | Rixford .............. G06Q 30/0641 |
| 10,489,355 | B1* | 11/2019 | Messmer .............. G06F 16/211 |
| 10,664,487 | B2 | 5/2020 | Bruce et al. |
| 2010/0030733 | A1 | 2/2010 | Draughn, Jr. |
| 2011/0145735 | A1* | 6/2011 | Driesner ................ G06Q 10/06 |
|  |  |  | 715/762 |

* cited by examiner

*Primary Examiner* — Hung T Vy
(74) *Attorney, Agent, or Firm* — Banner & Witcoff, Ltd.

(57) ABSTRACT

Arrangements for database schema creation and control are provided. In some aspects, a user may request creation or modification of a database schema. In response to receiving the request, one or more interactive user interfaces may be generated. The one or more interactive user interfaces may enable a user to select one or more selectable options for presenting data, establishing relationships between data, data sources, and the like. The schema, including a schema configuration including the presentational aspects and relationships, may be stored. A user may request to view data and the stored database schema may be retrieved. The schema may be transmitted to a configuration engine that may retrieve the requested data from one or more non-relational database sources. One or more user interfaces may be dynamically generated based on the schema configuration and may include the retrieved data.

16 Claims, 12 Drawing Sheets

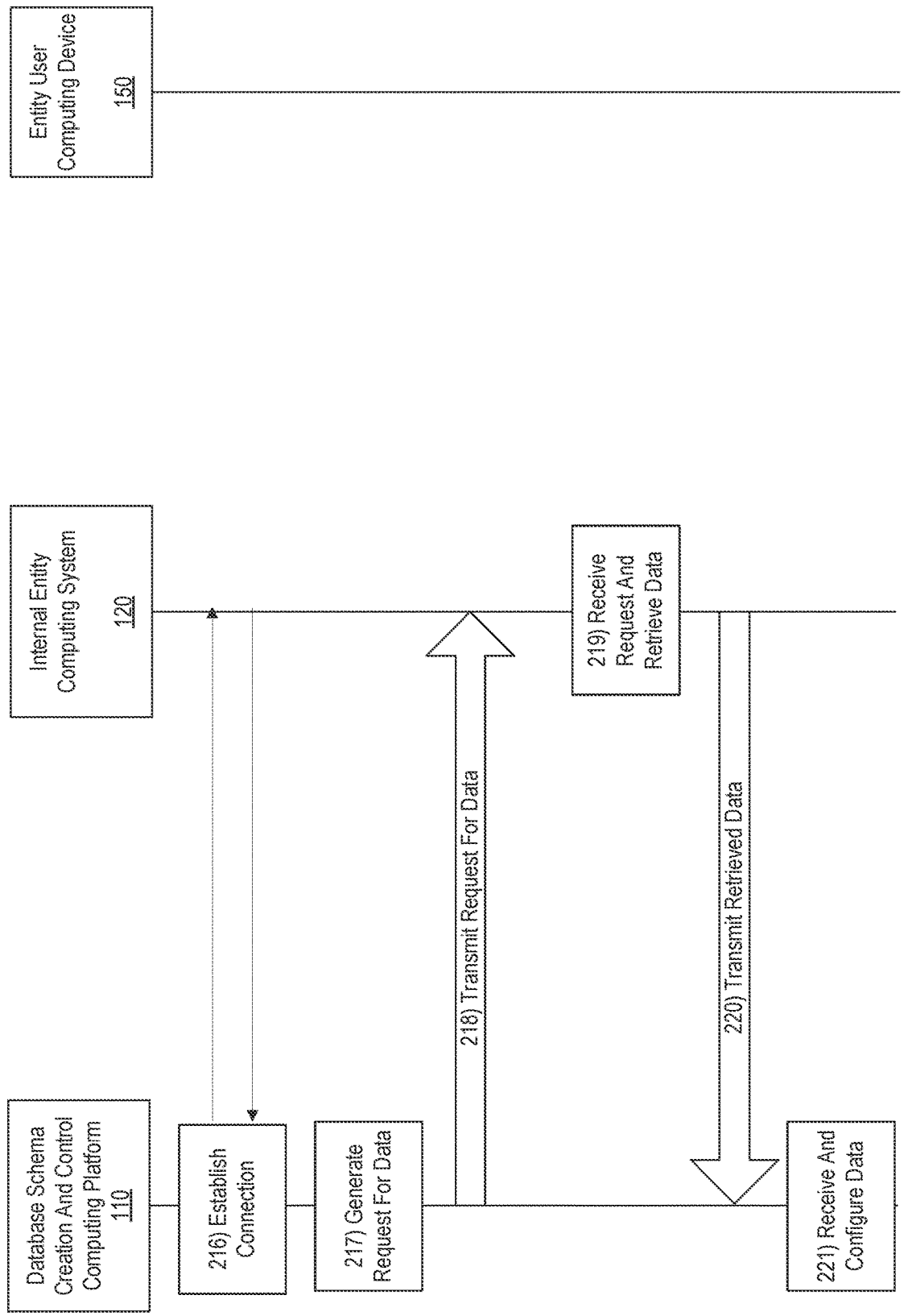

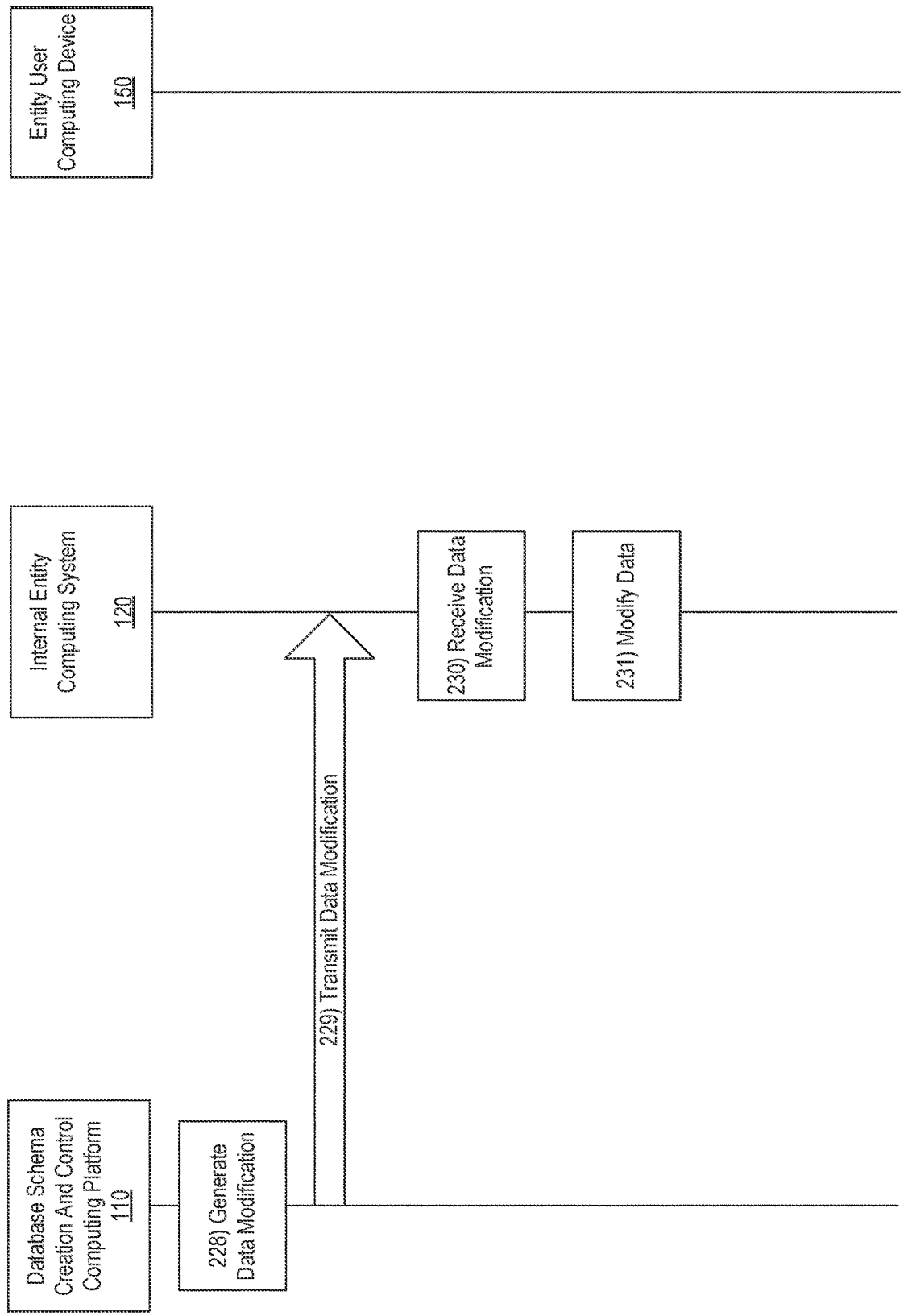

CONFIGURATION ENGINE FOR DYNAMICALLY GENERATING USER INTERFACES

BACKGROUND

Aspects of the disclosure relate to electrical computers, systems, and devices performing database schema creation and control functions and including a configuration engine for dynamically generating user interfaces.

Storing data for later retrieval and display is an everyday part of the business of many enterprise organizations. Existing non-relational databases might not allow for streamlined composition of reading and/or updating queries of separate but related sources of data. Conventional user interfaces used to address relational creating, reading, updating and deleting operations are dynamically unchangeable due to the dependencies on the state at the time they are created. Accordingly, in these conventional systems, new additions of entities and even minor changes to database sources may result in major disruptions that require deployments in order to address the change. In addition, conventional systems may require users to update data in multiple places. These arrangements may require users to maintain knowledge of ever-changing, complex relations between various sources and to update data in multiple locations, which may lead to inaccuracies and mismatched data. Accordingly, arrangements to enable dynamic, relational presentation of data stored in a non-relational database may be advantageous.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical dynamically displaying data from a non-relational database in a relational manner.

In some aspects, a user may request creation or modification of a database schema. In response to receiving the request, one or more interactive user interfaces may be generated. The one or more interactive user interfaces may enable a user to select one or more selectable options for presenting data, establishing relationships between data, data sources, and the like. The schema, including a schema configuration including the presentational aspects and relationships, may be stored.

A user may request to view data and the stored database schema may be retrieved. The schema may be transmitted to a configuration engine that may retrieve the requested data from one or more non-relational database sources. One or more user interfaces may then be dynamically generated based on the schema configuration and may include the retrieved data. The one or more user interfaces may be transmitted to a user computing device for display.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for implementing database schema creation and control functions in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, conventional non-relational databases, just as NoSQL databases, might not allow for streamlined composition of reading and/or updating queries of separate but related sources of data. In addition, modifications to non-relational databases in conventional arrangements can be rigid, require deployments, and may result in various inaccuracies in the data.

Accordingly, arrangements described herein are related to user-created schema configurations that may dynamically present custom views to users where data can be holistically accessed and updated. In some examples, different views can be created from a same set of data based on the user, their role or job function, business unit, or other user attribute. In some examples, changes to database schemas may be relayed to the dynamic configuration in real-time or near real-time without any disruptions or display purposes.

In some examples, a user may request to modify data displayed based on the database schema. Accordingly, a configuration engine may identify relational mapping of the data to deconstruct the data into its subcomponents and subsequently programmatically update the database sources.

As will be discussed more fully herein, in some arrangements, the system may generate one or more interactive user interfaces to aid users in creating a schema and/or schema configuration. In some examples, the one or more user interfaces may provide step-by-step processes for specifying presentational components and/or relationships between data, data sources, and the like.

One or more other user interfaces may also be generated by the system to display the requested data based on the generated schema and retrieved data. The user interfaces may be generated in real-time or near real-time to quickly and accurately present data to the user.

These and various other arrangements will be discussed more fully below.

Figure 1A:
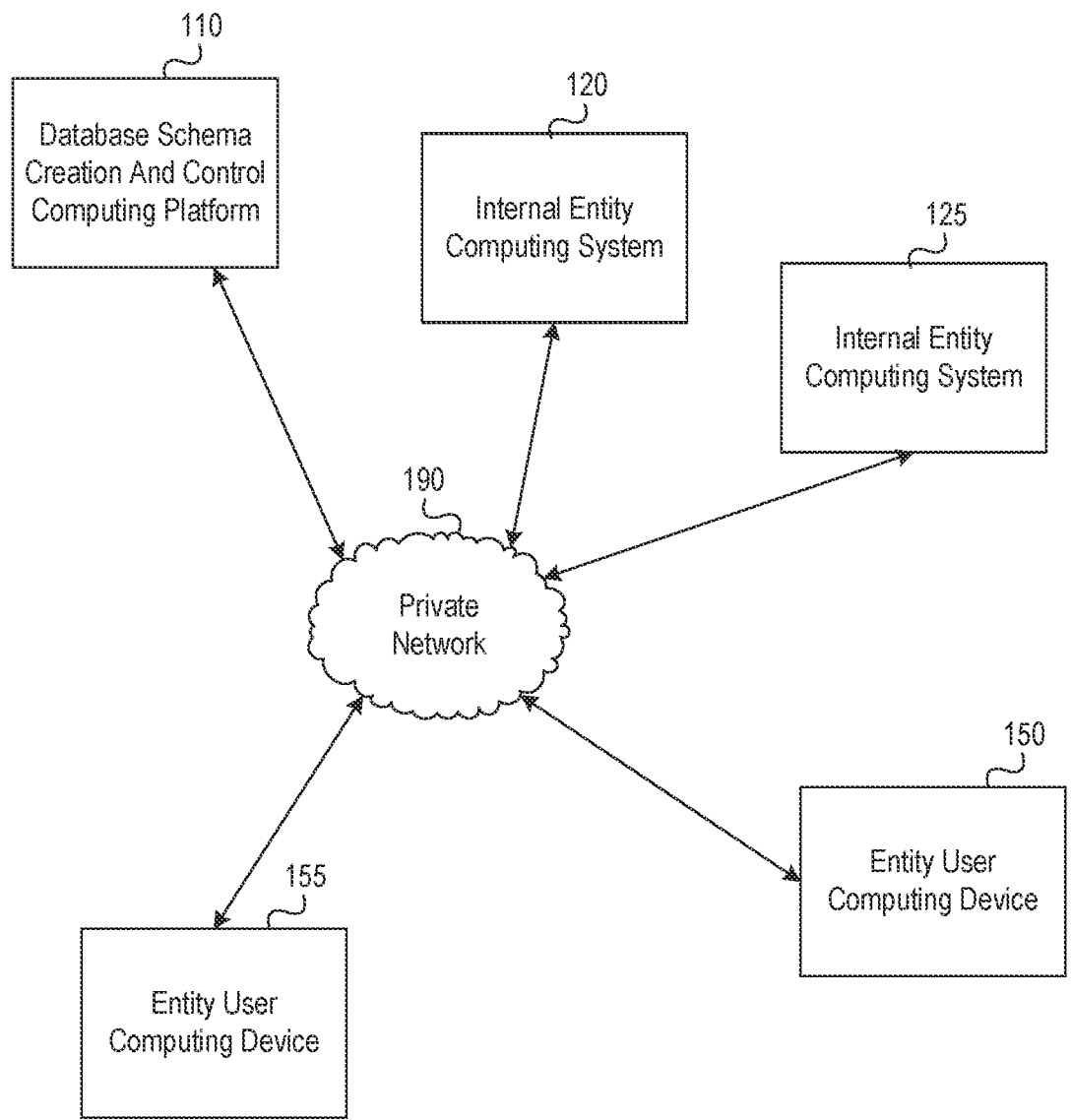
FIGS. 1A and 1B depict an illustrative computing environment for implementing database schema creation and control functions in accordance with one or more aspects described herein.
Figure 1B:
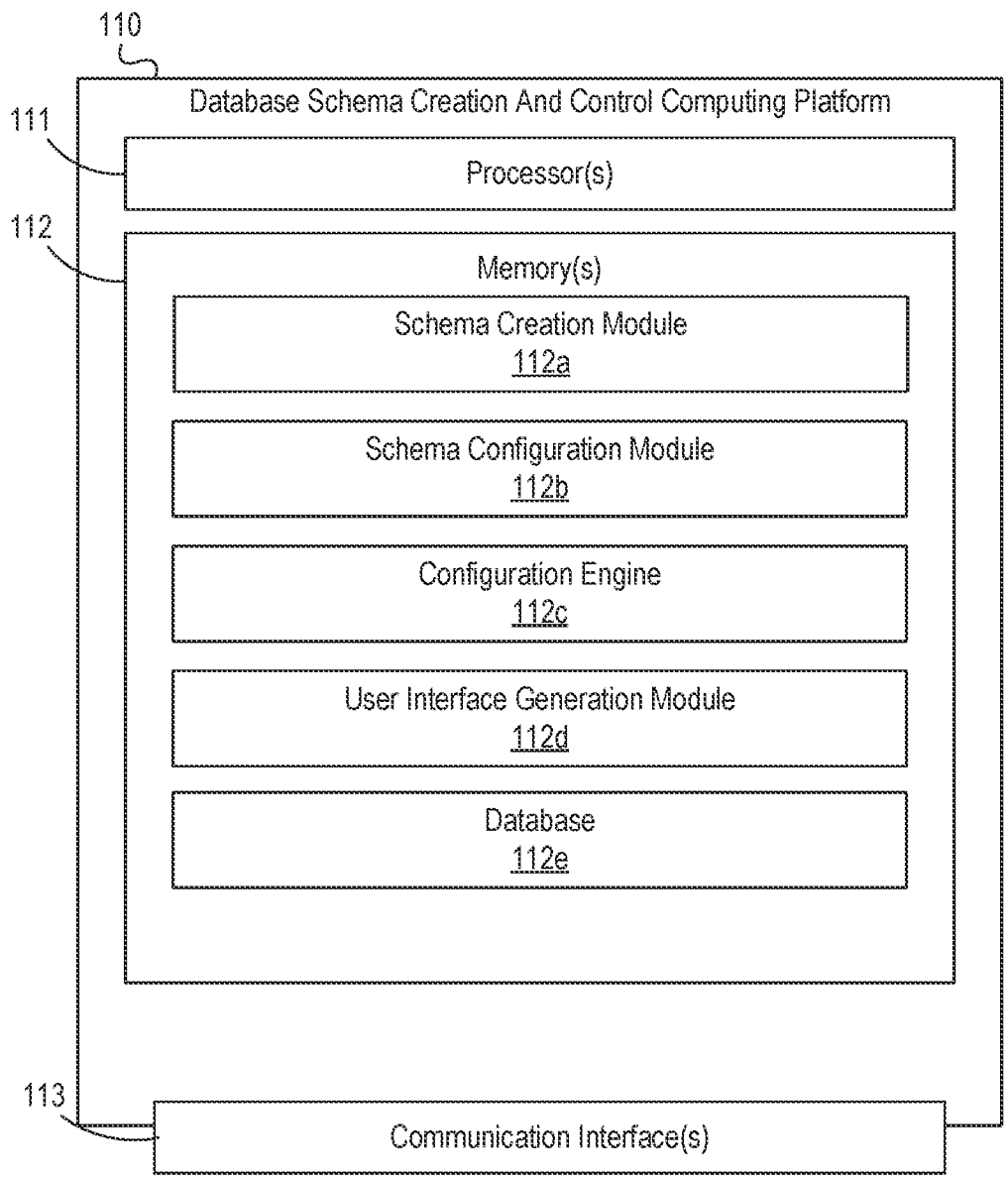

FIGS. 1A-1B depict an illustrative computing environment for implementing and using a configuration engine to dynamically display data based on customized database schema in accordance with one or more aspects described herein. Referring to FIG. 1A, computing environment 100 may include one or more computing devices and/or other computing systems. For example, computing environment 100 may include database schema creation and control computing platform 110, internal entity computing system 120, internal entity computing system 125, entity user computing device 150, and entity user computing device 155. Although two internal entity computing systems 120, 125 and two entity user computing devices 150, 155 are shown, more or fewer devices may be used with the system without departing from the invention.

Database schema creation and control computing platform 110 may be configured to provide intelligent, dynamic database schema creation and control functions, including dynamically displaying data based on customized database schema. For instance, database schema creation and control computing platform 110 may receive, from a user computing device such as entity user computing device 150, entity user computing device 155, or the like, a request to create and/or update a database schema. In response to the request, the database schema creation and control computing platform 110 may generate and transmit one or more interactive user interfaces enabling creation of the database schema. The interface(s) may be transmitted to the user computing device to receive user input selecting one or more options provided to the user. In some examples, the interface(s) may provide a step-by-step process for creating the schema, identifying relations between data for display, identifying sources of data from one or more non-relational databases, identifying presentational components, or the like. In some arrangements, the user interface(s) and/or selectable options may be generated based on a job function, role, position, level, or the like, of the user, such that different options may be available for selection based on the particular user, job function, role, position, level, or the like.

The generated schema may include a schema configuration storing or implementing the customized selections made by the user. The schema and associated configuration may be stored by the database schema creation and control computing platform 110.

After creating and/or updating a database schema, the database schema creation and control computing platform 110 may receive a request to display data associated with the schema. Based on the request, the database schema creation and control computing platform 110 may transmit the stored version of the schema to a configuration engine that may retrieve data from one or more source databases (e.g., that may be associated with one or more of internal entity computing system 120, internal entity computing system 125, or the like. In some examples, the source databases may be non-relational databases. Accordingly, by creating the schema, relations between data may be identified and data may be displayed according to the relations, without the use of a relational database.

The database schema creation and control computing platform 110 may dynamically generate, based on the retrieved data and schema configuration, one or more user interfaces displaying the requested data. The dynamic user interfaces may be generated based on live data retrieved from the source databases but displayed based on relations identified in the schema configuration.

In some examples, a user may select to modify data (e.g., via the dynamically generated user interface(s)). If data is modified, the modification may, in some examples, be transmitted to the configuration engine that will push the modification to the appropriate source database. For instance, in some examples, the configuration engine may identify relational mapping of the data to deconstruct the data into its subcomponents and subsequently programmatically update the database sources.

Internal entity computing system 120 and/or internal entity computing system 125 may be one or more computing devices, systems, or the like, associated with the entity or enterprise organization implementing the database schema creation and control computing platform 110. Internal entity computing system 120 and/or internal entity computing system 125 may have or include one or more databases, such as non-relational databases, storing various types of data, data elements, and the like. In some examples, internal entity computing system 120 and/or internal entity computing system 125 may also have, store or include one or more applications executing thereon and providing one or more business functions to the enterprise organization.

Entity user computing device 150 and/or entity user computing device 155 may be one or more computing devices associated with the enterprise organization. For instance, entity user computing device 150 and/or entity user computing device 155 may be a computing device accessed by one or more users (e.g., employees of the enterprise organization) in the course of business and may be used to request creation or modification of a database schema, display an interactive user interface for creating a database schema, request display of data, display one or more user interfaces including requested data, and the like.

Computing environment 100 also may include one or more computing platforms. For example, and as noted above, computing environment 100 may include database schema creation and control computing platform 110. As illustrated in greater detail below, database schema creation and control computing platform 110 may include one or more computing devices configured to perform one or more of the functions described herein. For example, database schema creation and control computing platform 110 may include one or more computers (e.g., laptop computers, desktop computers, servers, server blades, or the like).

As mentioned above, computing environment 100 also may include one or more networks, which may interconnect one or more of database schema creation and control computing platform 110, internal entity computing system 120, internal entity computing system 125, entity user computing device 150, and/or entity user computing device 155. For example, computing environment 100 may include private network 190. In some examples, the computing environment 100 may also include a public network through which one or more devices external to the enterprise organization may access one or more systems within the enterprise organization. Private network 190 and/or any public network may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, database schema creation and control computing platform 110, internal entity computing system 120, internal entity computing system 125, entity user computing device 150, and entity user computing device 155, may be associated with an enterprise organization (e.g., a financial institution), and private network 190 may be associated with and/or operated by the organization, and may include one or more networks (e.g., LANs, WANs, virtual private networks (VPNs), or the like) that interconnect database schema creation and control computing platform 110, internal entity computing system 120, internal entity computing system 125, entity user computing device 150, entity user computing device 155, and one or more other computing devices and/or computer systems that are used by, operated by, and/or otherwise associated with the organization.

Referring to FIG. 1B, database schema creation and control computing platform 110 may include one or more processors 111, memory 112, and communication interface 113. A data bus may interconnect processor(s) 111, memory 112, and communication interface 113. Communication interface 113 may be a network interface configured to support communication between database schema creation and control computing platform 110 and one or more networks (e.g., private network 190, public network, or the like). Memory 112 may include one or more program modules having instructions that when executed by processor(s) 111 cause database schema creation and control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of database schema creation and control computing platform 110 and/or by different computing devices that may form and/or otherwise make up database schema creation and control computing platform 110.

For example, memory 112 may have, store and/or include schema creation module 112a. Schema creation module 112a may store instructions and/or data that may cause or enable the database schema creation and control computing platform 110 to receive a request to create or modify a database schema, generate one or more interactive user interfaces to facilitate creation or modification of the database schema, and the like. In some examples, schema creation module 112a may receive or capture user data associated with the user requesting creation or modification of the schema and may modify options provided via the interactive user interface based on the user data. For instance, user data may include a job function of the user, level, business group, role, or the like. Accordingly, the interactive user interface may be generated to include customized options available for selection by the user based on the user data.

Database schema creation and control computing platform 110 may further have, store and/or include schema configuration module 112b. Schema configuration module 112b may store instructions and/or data that may cause or enable the database schema creation and control computing platform 110 to generate a schema configuration based on selections made by a user via the one or more interactive user interfaces generated by the schema creation module. In some examples, the schema configuration module 112b may store one or more relations between data or data sources, presentational components, and the like, for display to the user. Accordingly, as data is retrieved, it may be displayed based on relations identified in the schema configuration. In some examples, a generated database schema including a schema configuration may be stored by the database schema creation and control computing platform 110 in, for instance, database 112e.

Database schema creation and control computing platform 110 may further have, store and/or include a configuration engine 112c. Configuration engine 112c may store instructions and/or data that may cause or enable the database schema creation and control computing platform 110 to receive a request to display data, receive a schema configuration associated with the request to display data and retrieve data from one or more source databases based on the schema configuration. In some examples, if data modifications are requested, the configuration engine 112c may receive the data modifications and transmit the modifications to a source database for execution. For instance, the configuration engine 112c may identify relational mapping of the data to deconstruct the data into its subcomponents and subsequently programmatically update the database sources based on the requested data modification.

Database schema creation and control computing platform 110 may further have, store and/or include user interface generation module 112d. User interface generation module 112d may store instructions and/or data that may cause or enable database schema creation and control computing platform 110 to generate one or more interactive user interfaces for display on, for instance, entity user computing device 150, entity user computing device 155, or the like. For instance, one or more interactive user interfaces generated based on retrieved user data and a schema configuration may be generated and transmitted for display on entity user computing device 150, entity user computing device 155, or the like. The data may be displayed based on relations established via the schema configuration. In some examples, the interactive user interfaces may enable a user to modify or request modification of data. Any requests for data modification may be transmitted to the configuration engine 112c for execution.

FIGS. 2A-2F depict one example illustrative event sequence for creating and using a database schema to display data from one or more non-relational databases in a relational manner in accordance with one or more aspects described herein. The events shown in the illustrative event sequence are merely one example sequence and additional events may be added, or events may be omitted, without departing from the invention. Further, one or more processes discussed with respect to FIGS. 2A-2F may be performed in real-time or near real-time.

Figure 2A:
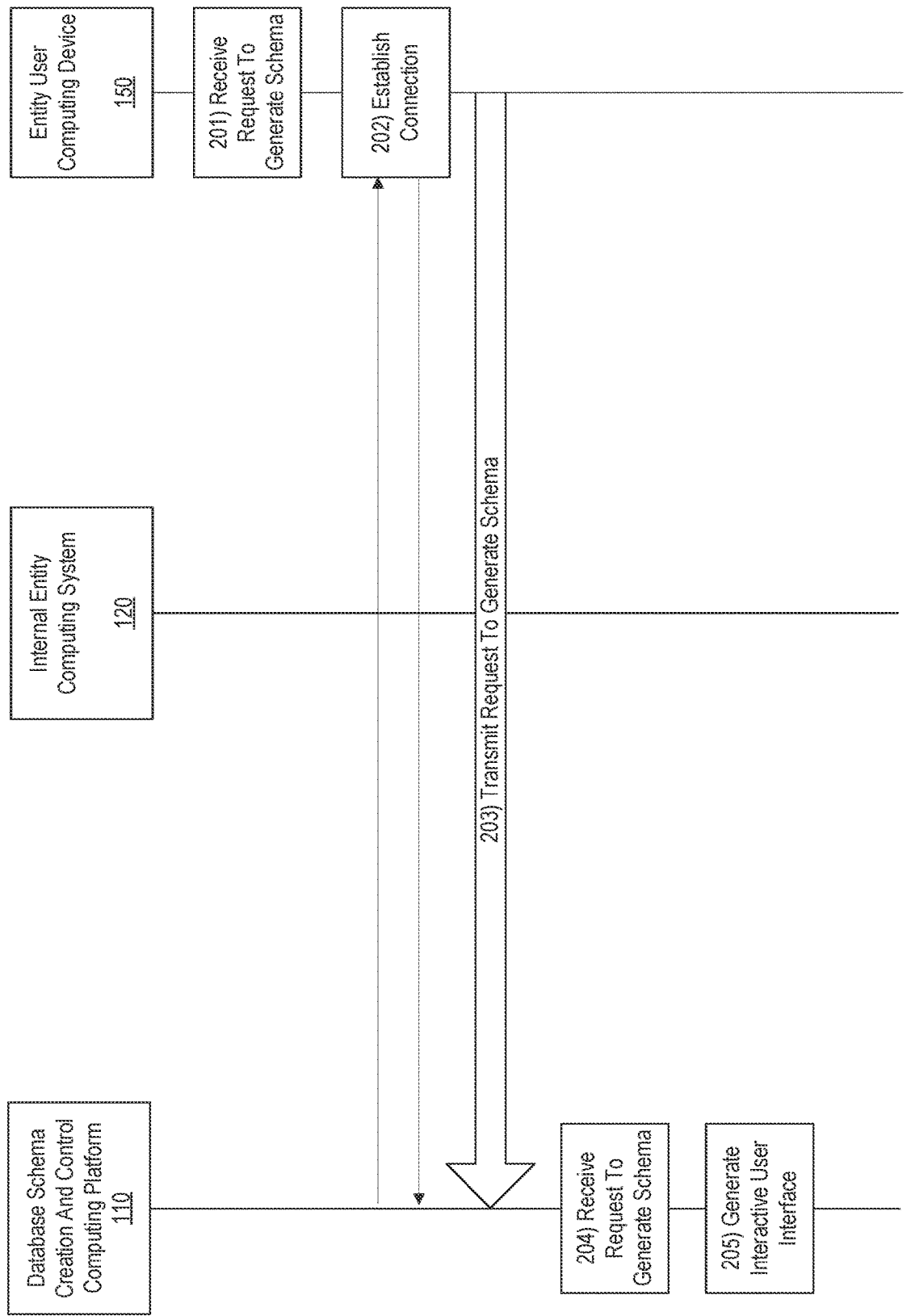

Referring to FIG. 2A, at step 201, an entity user computing device, such as entity user computing device 150, may receive a request to generate or modify a database schema. For instance, a user associated with an enterprise organization may request to create a database schema. In some examples, the request to create or modify the database schema may be input by the user. Additionally or alternatively, a user may request to view data and the system may determine that a database schema should be created based on the request to display data.

In some examples, the request may include identification of a user associated with the request. In some examples, the request may include additional user data, such as role, job function, line of business, or the like. Additionally or alternatively, the user data may be retrieved from one or more other sources, such as a database storing user data.

At step 202, a connection may be established between the entity user computing device 150 and the database schema creation and control computing platform 110. For instance, a first wireless connection may be established between the entity user computing device 150 and database schema creation and control computing platform 110. Upon establishing the first wireless connection, a communication session may be initiated between database schema creation and control computing platform 110 and entity user computing device 150.

At step 203, the request to create or modify the database schema may be transmitted from the entity user computing device 150 to the database schema creation and control computing platform 110. For instance, the request to create or modify the database schema may be transmitted from the entity user computing device 150 to the database schema creation and control computing platform 110 during the communication session initiated upon establishing the first wireless connection.

At step 204, the database schema creation and control computing platform 110 may receive the request to generate, create or modify a database schema. At step 205, the database schema creation and control computing platform 110 may generate one or more interactive user interfaces to facilitate creation of the database schema. In some examples, generating the one or more interactive user interfaces may be based on user data received with the request to create a database schema or retrieved based on the request. The user data may be used to customize selectable options provided to the user via the interactive user interface based on, for instance, job function, business group, or the like.

Figure 2B:
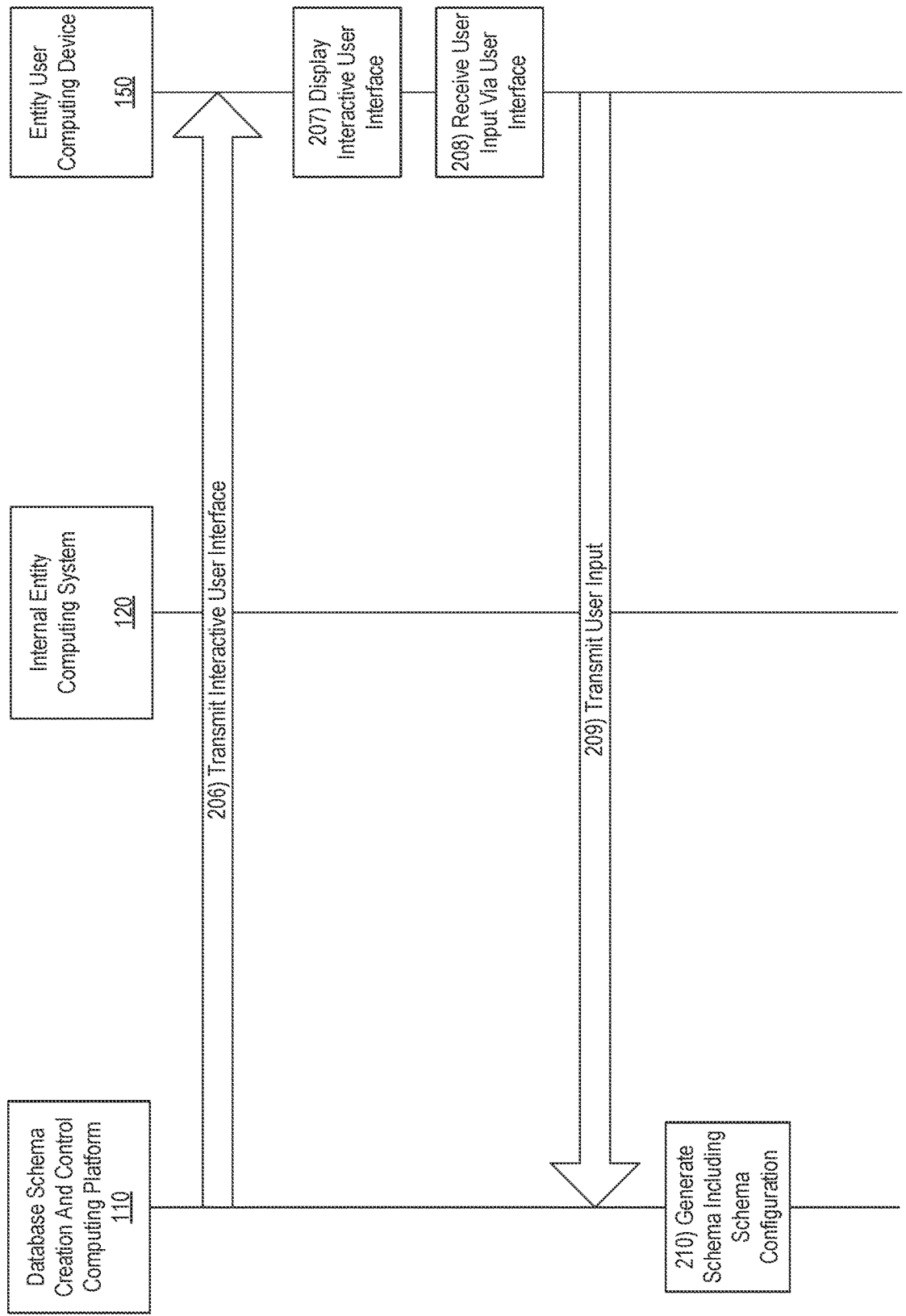

With reference to FIG. 2B, at step 206, database schema creation and control computing platform 110 may transmit the generated interactive user interface(s) to entity user computing device 150. Transmitting the interactive user interface(s) may include transmitting an instruction to command causing the interactive user interface(s) to be displayed on a display of the entity user computing device.

At step 207, the interactive user interface(s) may be received by the entity user computing device 150 and displayed by a display of the entity user computing device 150.

At step 208, entity user computing device 150 may receive user input including one or more option selections made via the interactive user interface(s). For instance, a user may build a database schema to display the desired or requested data by selecting one or more options from the one or more user interfaces. Accordingly, the options provided to the user may be customized based on user data, and the schema created may be customized based on user selections. In some examples, the user selections may include identification of one or more relations between data that may be stored in and/or retrieved from a non-relational database.

At step 209, the received user input (e.g., user selections) may be transmitted from the entity user computing device 150 to the database schema creation and control computing platform 110.

At step 210, the user input may be received and, based on the received input, the requested schema may be generated or created by the database schema creation and control computing platform 110. As discussed herein, the generated schema may include a schema configuration including relations identified or other parameters, such as presentational components, selected by the user in creating the database schema.

Figure 2C:
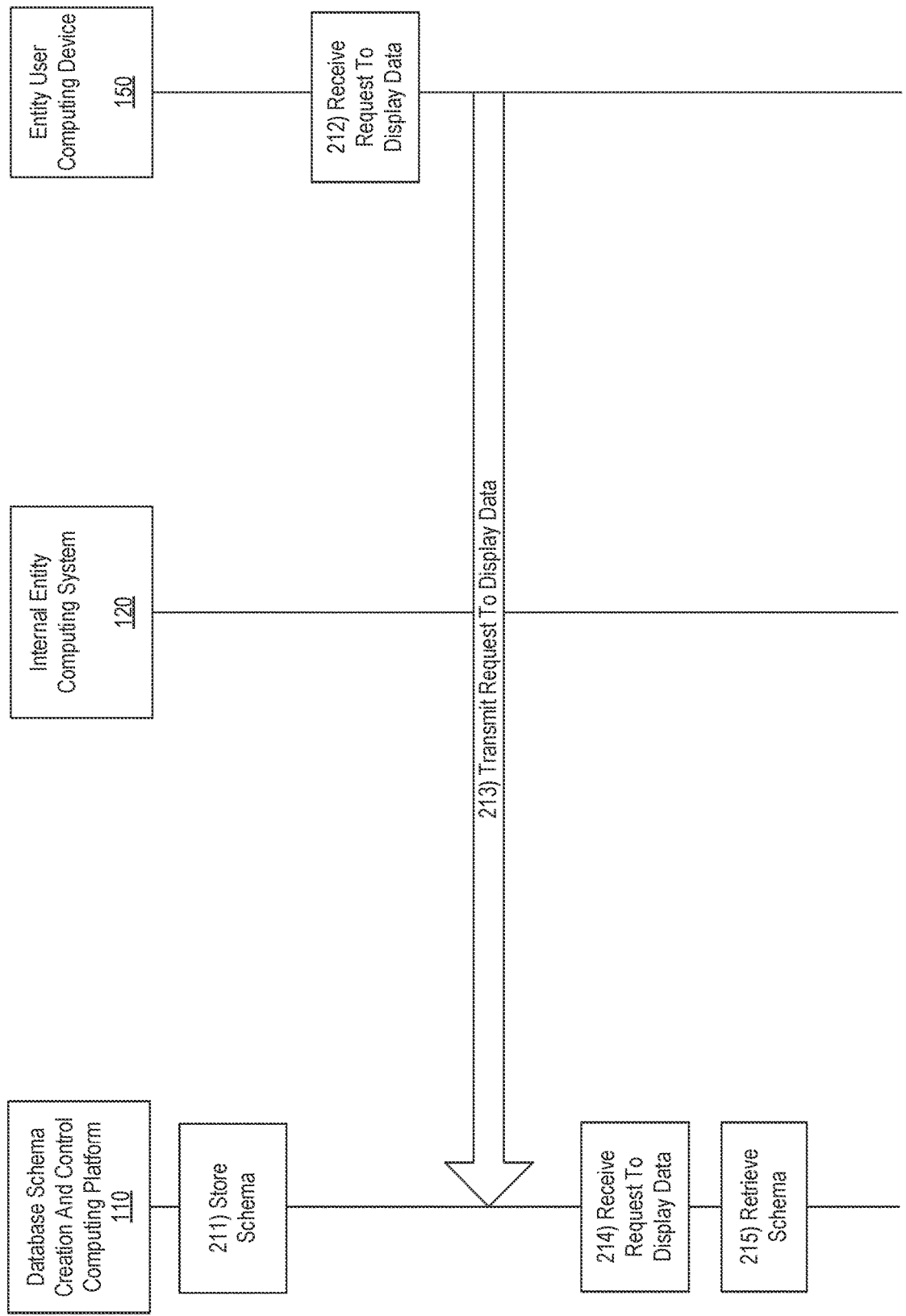

With reference to FIG. 2C, at step 211, the generated schema and associated configuration may be stored. For instance, the generated schema may be stored in a database of the database schema creation and control computing platform 110.

At step 212, entity user computing device 150 may receive a request to view or display data. In examples in which the request to create or modify a database schema included a request to display data, step 212 may be omitted.

In some examples, the request to view or display data may include identification of a particular schema, identification of a user associated with the request, and the like.

At step 213, the request to view or display data may be transmitted from the entity user computing device 150 to the database schema creation and control computing platform 110. At step 214, the request to view or display data may be received by database schema creation and control computing platform 110.

At step 215, a stored schema may be retrieved. For instance, a schema identified in a request to view or display data may be retrieved from, for instance, a database in database schema creation and control computing platform 110. Additionally or alternatively, a schema may be identified and retrieved based on a user requesting to view or display the data. In some examples, retrieving the schema may include retrieving a schema configuration and transmitting the configuration to the configuration engine of database schema creation and control computing platform 110.

With reference to FIG. 2D, at step 216, a connection may be established between the database schema creation and control computing platform 110 and the internal entity computing system 120. For instance, a second wireless connection may be established between the database schema creation and control computing platform 110 and the internal entity computing system 120. Upon establishing the second wireless connection, a communication session may be initiated between database schema creation and control computing platform 110 and internal entity computing system 120.

At step 217, a request for data may be generated. For instance, configuration engine 112c of database schema creation and control computing platform 110 may receive the schema configuration and generate a request for data from one or more source databases. In some examples, the source databases may be non-relational databases.

At step 218, the generated request for data may be transmitted from the database schema creation and control computing platform 110 to one or more source databases, such as internal entity computing system 120 that may include one or more databases.

At step 219, the request for data may be received and executed to retrieve the requested data. At step 220, the retrieved data may be transmitted from internal entity computing system 120 to database schema creation and control computing platform 110.

At step 221, the retrieved data may be received by the database schema creation and control computing platform 110 and configured (e.g., by configuration engine 112c) based on the schema configuration. Accordingly, relations established between data, data sources, and the like, based on user input may be identified and the data may be configured for display (e.g., based on the data, selected presentational components in the schema configuration, and the like).

Figure 2E:
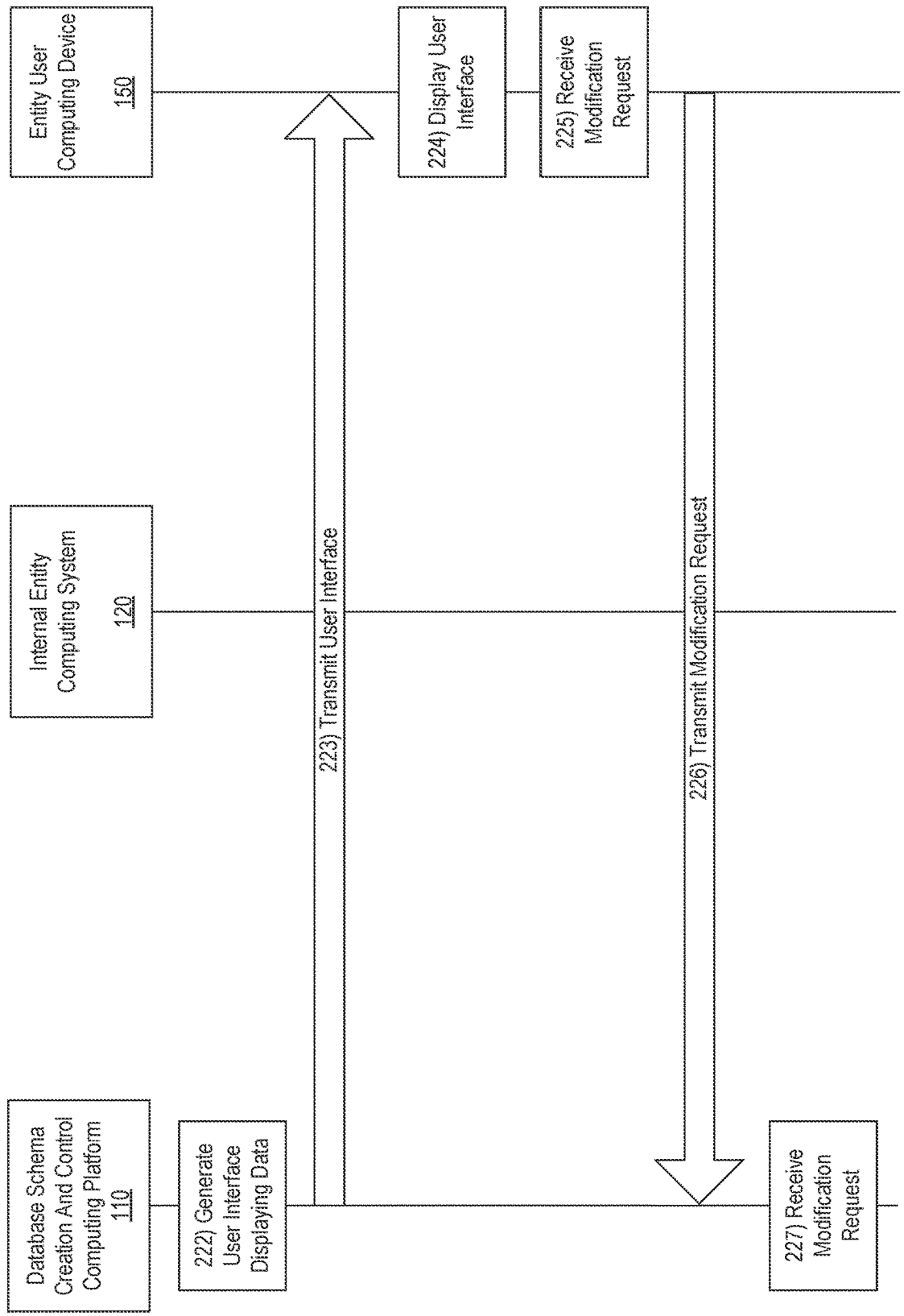

With reference to FIG. 2E, at step 222, one or more user interfaces displaying the requested data may be generated. The user interfaces may be generated based on the schema configuration built by the user and may display the data based on relations and/or presentational components selected or input by the user. Accordingly, the user interface may be customized to display data based on user input. In some examples, the one or more user interfaces may be interactive and may enable a user to request modification of data.

At step 223, the generated one or more user interfaces may be transmitted to the entity user computing device 150. In some examples, transmitting the user interfaces may include transmitting an instruction or command causing the user interfaces to display on a display of entity user computing device 150.

At step 224, the user interfaces may be received by entity user computing device 150 and displayed by a display of entity user computing device 150.

At step 225, user input including a request for modification of data may be received by entity user computing device 150. For instance, a user may request to change a data element, delete an element, or the like. At step 226, the data modification request may be transmitted by the entity user computing device 150 to the database schema creation and control computing platform 110.

At step 227, the modification request may be received by database schema creation and control computing platform 110.

With reference to FIG. 2F, at step 228, relational mapping of the data may be identified to deconstruct the data into its subcomponents and an instruction to modify the data may be generated. For instance, configuration engine 112c may generate an instruction to modify data based on the received modification request, relational mapping, data deconstruction, and the like. The generated instructions may include an instruction to programmatically update the database sources based on the data modification.

At step 229, the instruction to modify the data may be transmitted by the database schema creation and control computing platform 110 to the internal entity computing system 120. At step 230, the instruction may be received by internal entity computing system 120 and, at step 231, the instruction may be executed and the data may be modified. Accordingly, subsequent requests to display data associated with that schema may include retrieving the modified data and displaying that data.

Figure 3:
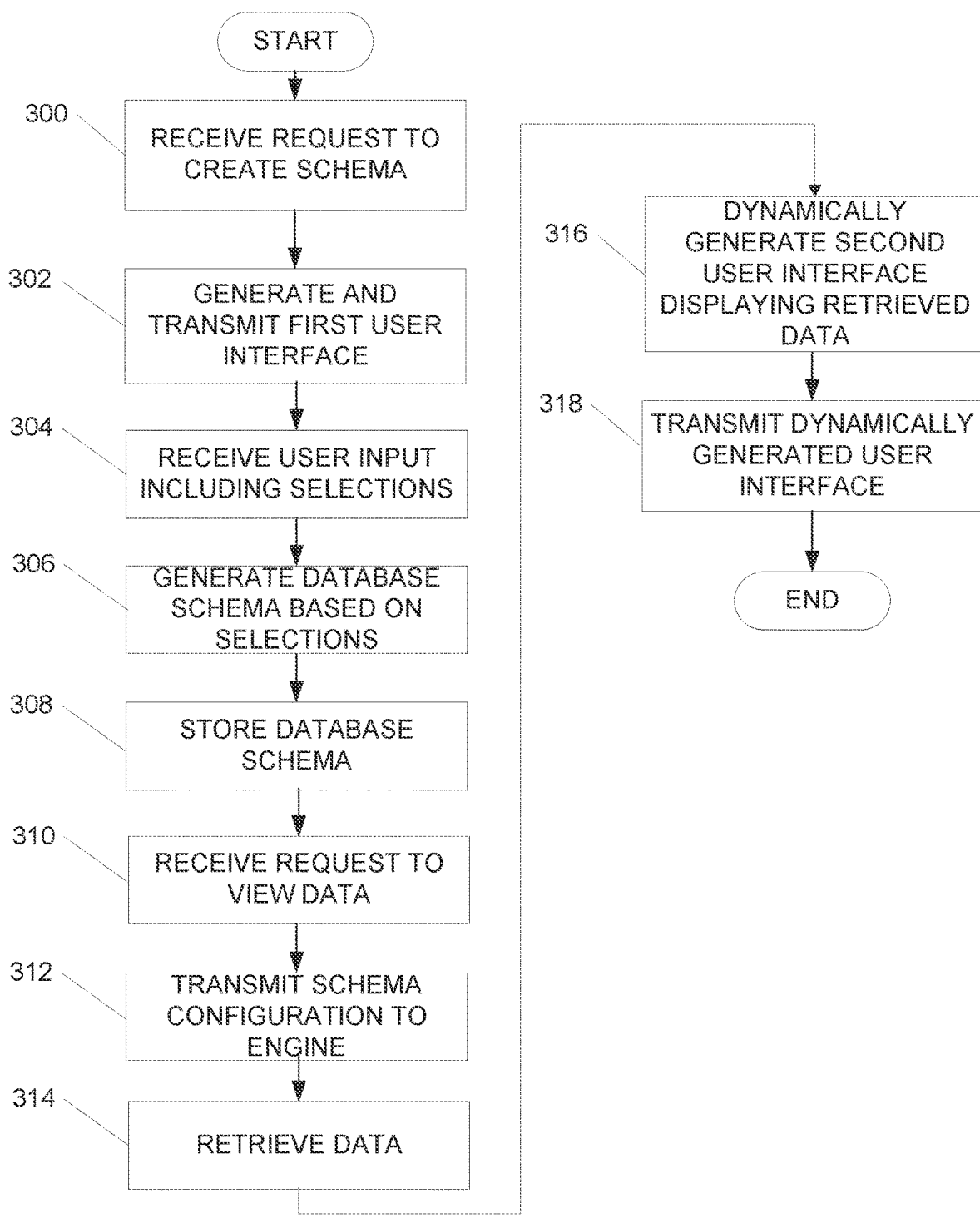
FIG. 3 illustrates an illustrative method for implementing database schema creation and control functions according to one or more aspects described herein.

FIG. 3 is a flow chart illustrating one example method of creating and using a database schema to display data from one or more non-relational databases in a relational manner according to one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a request to create or modify a database schema may be received. For instance, database schema creation and control computing platform 110 may receive the request to create or modify a database schema from an entity user computing device, such as entity user computing device 150. In some examples, the request to create or modify the database schema may be received as part of or extracted from a request to view data received from the entity user computing device. In some arrangements, the request may include user data or attributes of a user, such as user identifying data, job function data, business group data, or the like. Additionally or alternatively, user data or attributes of the user may be retrieved from one or more databases in response to receiving the request to create or modify the database schema.

At step 302, a first user interface may be generated and transmitted to the entity user computing device. For instance, database schema creation and control computing platform 110 may generate one or more interactive user interfaces configured to provide step-by-step processes to create or modify the database schema. The first user interface may include a plurality of selectable options available for selection by the user. In some arrangements, the selectable options provided via the first interface may be identified or determined based on the user data associated with the user requesting the creation or modification of the database schema. In some examples, transmitting the first user interface may cause the first user interface to display on a display of the entity user computing device 150.

Figure 4:
FIG. 4 illustrates one example user interface for creating or modifying a database schema in accordance with one or more aspects described herein.

FIG. 4 illustrates one example user interface 400 that may be generated and transmitted. The user interface 400 includes a plurality of selectable options, drop down menus and the like. In some examples, drag and drop aspects may be used to select options. While interface 400 is one example interface, additional interfaces providing alternative or additional selectable options may be used without departing from the invention.

At step 304, user input including one or more selections may be received by the database schema creation and control computing platform 110. For instance, a user may input into the entity user computing device, via the first user interface, one or more selections of the plurality of selectable options. The one or more selections may identify presentational components and/or relationships between different data, data sources, and the like.

At step 306, the database schema may be generated, created or modified based on the user input received. For instance, the requested database schema may be generated, created or modified based on the selections made by the user via the first user interface. The database schema may include a schema configuration holding or defining the presentational components and/or relationships between data.

At step 308, the database schema may be stored. For instance, the database schema may be stored in a database of the database schema creation and control computing platform 110.

At step 310, a request to view data may be received. For instance, database schema creation and control computing platform 110 may receive, from, e.g., entity user computing device 150, a request to view data.

Responsive to receiving the request to view data, at step 312, the created or modified database schema may be retrieved and transmitted to a configuration engine of the database schema creation and control computing platform 110.

At step 314, the configuration engine may retrieve data from one or more non-relational databases. In some examples, retrieving the data may include retrieving data from a plurality of data tables.

At step 316, a second user interface may be dynamically generated. The second user interface may include the requested data presented according to the database schema (e.g., including the presentational components selected and the relationships between the data).

At step 318, the second user interface may be transmitted by the database schema creation and control computing platform 110 to the entity user computing device 150 and displayed on a display of the entity user computing device 150.

As discussed herein, aspects described are directed to dynamically displaying data from one or more non-relational databases in a relational manner. The aspects described herein provide one or more interactive user interfaces to aid users in creating a database schema and associated schema configuration. Further, dynamically generated user interfaces described herein may be used to display data based on the schema configuration. Accordingly, the dynamically generated user interfaces may include or display separately stored by related data in a single view based on a live reading or retrieval of the current schema configuration.

As discussed herein, the arrangements described include a configuration engine that implements the schema configuration to assemble multi-sourced data for reading and/or display in a dynamically generated user interface. In addition, the configuration engine may deconstruct the single-presenting data (e.g., data from multiple sources displayed together via the dynamically generated user interface) into its sub-components to be reinserted or modified in their respective sources.

Accordingly, the arrangements discussed herein provide a holistic view of data stored in different tables. In addition, the systems described enable or provide different or customized views of data from a same data set based on a role or other attribute of the user. The arrangements described further provide for real-time change updates to views presented to a user and assists users in creating a database schema.

Figure 5:
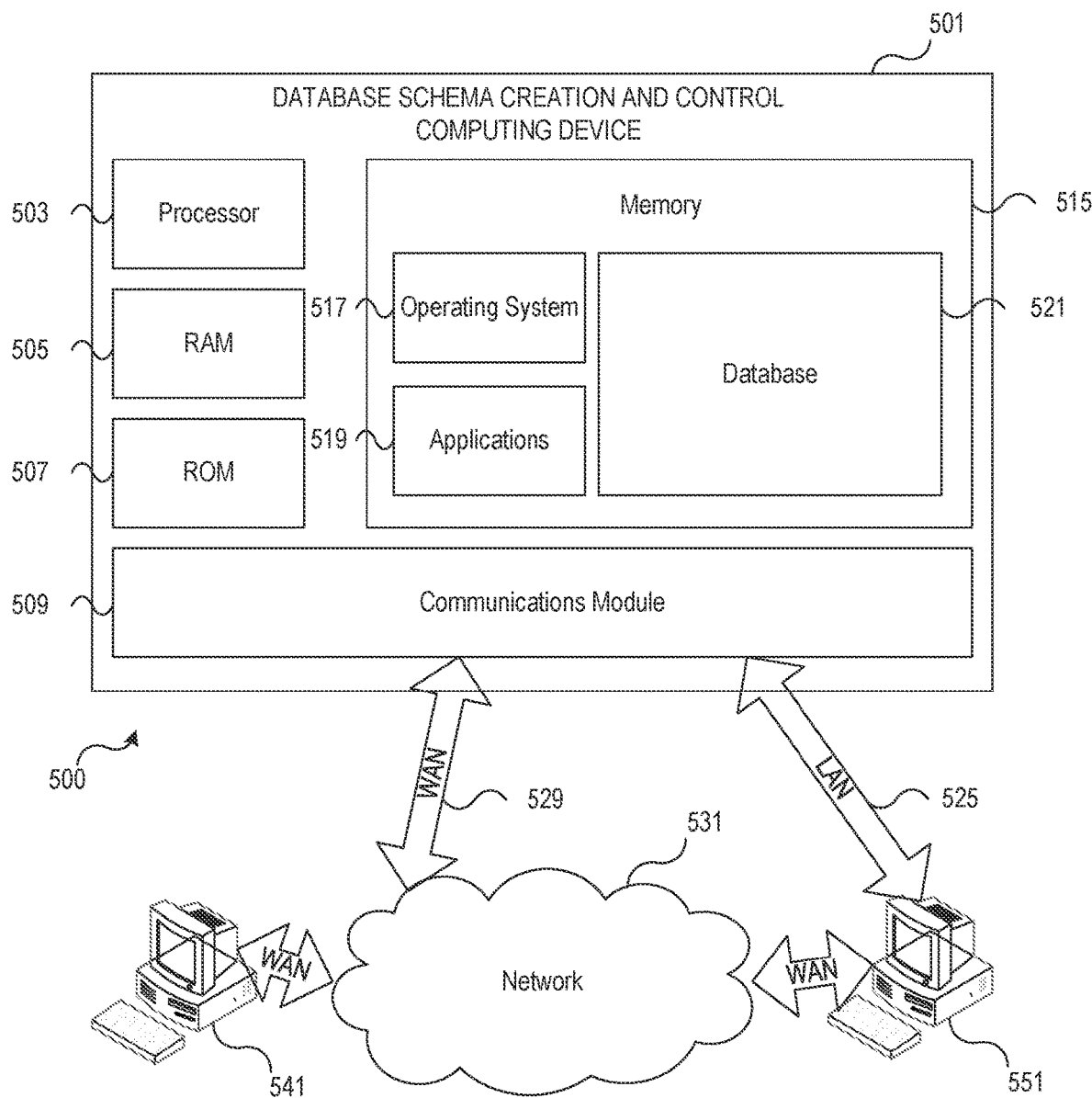
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include database schema creation and control computing device 501 having processor 503 for controlling overall operation of database schema creation and control computing device 501 and its associated components, including Random Access Memory (RAM) 505, Read-Only Memory (ROM) 507, communications module 509, and memory 515. Database schema creation and control computing device 501 may include a variety of computer readable media. Computer readable media may be any available media that may be accessed by database schema creation and control computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by database schema creation and control computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on database schema creation and control computing device 501. Such a processor may execute computer-executable instructions stored on a computer-readable medium.

Software may be stored within memory 515 and/or storage to provide instructions to processor 503 for enabling database schema creation and control computing device 501 to perform various functions as discussed herein. For example, memory 515 may store software used by database schema creation and control computing device 501, such as operating system 517, application programs 519, and associated database 521. Also, some or all of the computer executable instructions for database schema creation and control computing device 501 may be embodied in hardware or firmware. Although not shown, RAM 505 may include one or more applications representing the application data stored in RAM 505 while database schema creation and control computing device 501 is on and corresponding software applications (e.g., software tasks) are running on database schema creation and control computing device 501.

Communications module 509 may include a microphone, keypad, touch screen, and/or stylus through which a user of database schema creation and control computing device 501 may provide input, and may also include one or more of a speaker for providing audio output and a video display device for providing textual, audiovisual and/or graphical output. Computing system environment 500 may also include optical scanners (not shown).

Database schema creation and control computing device 501 may operate in a networked environment supporting connections to one or more remote computing devices, such as computing devices 541 and 551. Computing devices 541 and 551 may be personal computing devices or servers that include any or all of the elements described above relative to database schema creation and control computing device 501.

The network connections depicted in FIG. 5 may include Local Area Network (LAN) 525 and Wide Area Network (WAN) 529, as well as other networks. When used in a LAN networking environment, database schema creation and control computing device 501 may be connected to LAN 525 through a network interface or adapter in communications module 509. When used in a WAN networking environment, database schema creation and control computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 6:
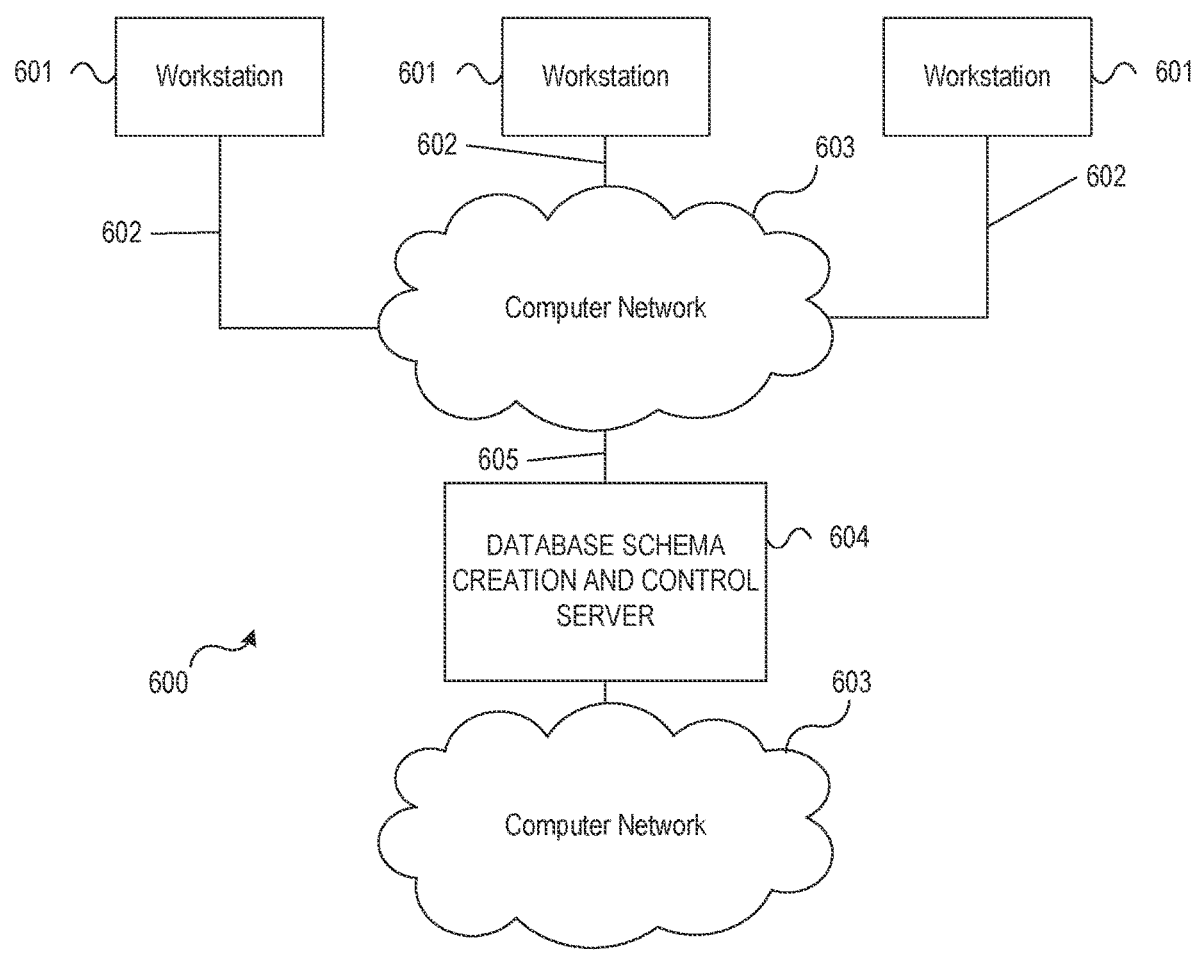
FIG. 6 depicts an illustrative block diagram of workstations and servers that may be used to implement the processes and functions of certain aspects of the present disclosure in accordance with one or more aspects described herein.

FIG. 6 depicts an illustrative block diagram of workstations and servers that may be used to implement the processes and functions of certain aspects of the present disclosure in accordance with one or more example embodiments. Referring to FIG. 6, illustrative system 600 may be used for implementing example embodiments according to the present disclosure. As illustrated, system 600 may include one or more workstation computers 601. Workstation 601 may be, for example, a desktop computer, a smartphone, a wireless device, a tablet computer, a laptop computer, and the like, configured to perform various processes described herein. Workstations 601 may be local or remote, and may be connected by one of communications links 602 to computer network 603 that is linked via communications link 605 to database schema creation and control server 604. In system 600, database schema creation and control server 604 may be a server, processor, computer, or data processing device, or combination of the same, configured to perform the functions and/or processes described herein. Server 604 may be used to receive requests to create or modify a database schema, generate and transmit interactive user interfaces, store database schema, retrieve and display data according to a schema configuration, modify data, and the like.

Computer network 603 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 602 and 605 may be communications links suitable for communicating between workstations 601 and database schema creation and control server 604, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
    at least one processor;
    a communication interface communicatively coupled to the at least one processor; and
    a memory storing computer-readable instructions that, when executed by the at least one processor, cause the computing platform to:
        receive, from a user computing device, a request to generate a database schema configured to present a customized data view of data;
        generate a first user interface, the first user interface providing a plurality of selectable options to generate the database schema;

receive, from the user computing device, user input selecting a first option of the plurality of selectable options;

generate the database schema based on the received user input, wherein the database schema includes a schema configuration including presentational components and relation information between different data sources associated with the data, wherein the different data sources include one or more non-relational databases;

store the database schema;

receive, from the user computing device, a request to view data;

transmit the database schema to a configuration engine configured to retrieve data from a non-relational database of the one or more non-relational databases and provide the retrieved data for display in a relational manner based on the schema configuration;

retrieve the data from the non-relational database;

dynamically generate, in real-time, a second user interface including the data retrieved from the non-relational database and display the data retrieved from the non-relational database according to the schema configuration;

transmit, to the user computing device for display, the dynamically generated second user interface;

receive, from the user computing device and via the second user interface displayed on the user computing device, user input requesting modification of data;

transmit, to the configuration engine, the request for modification of data; and cause, by the configuration engine, modification of data in the non-relational database, wherein causing, by the configuration engine, modification of the data in the non-relational database includes identifying relational mapping of the data to deconstruct the data into subcomponents and programmatically updating the non-relational database by pushing modified data to the non-relational database.

2. The computing platform of claim 1, wherein the plurality of selectable options is customized based on attributes of a user requesting to generate the database schema.

3. The computing platform of claim 2, wherein the attributes include at least one of: a job function of the user and a business group of the user.

4. The computing platform of claim 1, wherein the first user interface includes step-by-step instructions for creating the database schema.

5. The computing platform of claim 1, wherein retrieving the data from the non-relational database includes retrieving data from a plurality of data tables.

6. The computing platform of claim 1, further including instructions that, when executed, cause the computing platform to:

receive, from the user computing device, a subsequent request to view the data;

transmit the database schema to a configuration engine configured to retrieve the data from the non-relational database of the one or more non-relational databases and provide the retrieved data for display in a relational manner based on the schema configuration;

retrieve the data from the non-relational database, wherein retrieving the data from the non-relational database includes retrieving modified data;

dynamically generate, in real-time, a third user interface including the modified data retrieved from the non-relational database and display the modified data retrieved from the non-relational database according to the schema configuration; and transmit, to the user computing device for display, the dynamically generated third user interface, wherein transmitting, to the user computing device for display, the dynamically generated third user interface causes the user computing device to display the third user interface.

7. A method, comprising:

receiving, by a computing platform, the computing platform having at least one processor and memory and from a user computing device, a request to generate a database schema configured to present a customized data view of data;

generating, by the at least one processor, a first user interface providing a plurality of selectable options to generate the database schema;

receiving, by the at least one processor and from the user computing device, user input selecting a first option of the plurality of selectable options;

generating, by the at least one processor, the database schema based on the received user input, wherein the database schema includes a schema configuration including presentational components and relation information between different data sources associated with the data, wherein the different data sources include one or more non-relational databases;

storing, by the at least one processor, the database schema;

receiving, by the at least one processor and from the user computing device, a request to view data;

transmitting, by the at least one processor, the database schema to a configuration engine configured to retrieve data from a non-relational database of the one or more non-relational databases and provide the retrieved data for display in a relational manner based on the schema configuration;

retrieving, by the at least one processor, the data from the non-relational database;

dynamically generating, by the at least one processor and in real-time, a second user interface including the data retrieved from the non-relational database and displaying the data retrieved from the non-relational database according to the schema configuration;

transmitting, by the at least one processor, to the user computing device for display, the dynamically generated second user interface;

receiving, from the user computing device and via the second user interface displayed on the user computing device, user input requesting modification of data;

transmitting, to the configuration engine, the request for modification of data; and causing, by the configuration engine, modification of data in the non-relational database, wherein causing, by the configuration engine, modification of the data in the non-relational database includes identifying relational mapping of the data to deconstruct the data into subcomponents and programmatically updating the non-relational database by pushing modified data to the non-relational database.

8. The method of claim 7, wherein the plurality of selectable options is customized based on attributes of a user requesting to generate the database schema.

9. The method of claim 8, wherein the attributes include at least one of: a job function of the user and a business group of the user.

10. The method of claim 7, wherein the first user interface includes step-by-step instructions for creating the database schema.

11. The method of claim 7, wherein retrieving the data from the non-relational database includes retrieving data from a plurality of data tables.

12. One or more non-transitory computer-readable media storing instructions that, when executed by a computing platform comprising at least one processor, memory, and a communication interface, cause the computing platform to:

receive, from a user computing device, a request to generate a database schema configured to present a customized data view of data;

generate a first user interface, the first user interface providing a plurality of selectable options to generate the database schema;

receive, from the user computing device, user input selecting a first option of the plurality of selectable options;

generate the database schema based on the received user input, wherein the database schema includes a schema configuration including presentational components and relation information between different data sources associated with the data, wherein the different data sources include one or more non-relational databases;

store the database schema;

receive, from the user computing device, a request to view data;

transmit the database schema to a configuration engine configured to retrieve data from a non-relational database of the one or more non-relational databases and provide the retrieved data for display in a relational manner based on the schema configuration;

retrieve the data from the non-relational database;

dynamically generate, in real-time, a second user interface including the data retrieved from the non-relational database and display the data retrieved from the non-relational database according to the schema configuration;

transmit, to the user computing device for display, the dynamically generated second user interface;

receive, from the user computing device and via the second user interface displayed on the user computing device, user input requesting modification of data;

transmit, to the configuration engine, the request for modification of data; and cause, by the configuration engine, modification of data in the non-relational database, wherein causing, by the configuration engine, modification of the data in the non-relational database includes identifying relational mapping of the data to deconstruct the data into subcomponents and programmatically updating the non-relational database by pushing modified data to the non-relational database.

13. The one or more non-transitory computer-readable media of claim 12, wherein the plurality of selectable options is customized based on attributes of a user requesting to generate the database schema.

14. The one or more non-transitory computer-readable media of claim 13, wherein the attributes include at least one of: a job function of the user and a business group of the user.

15. The one or more non-transitory computer-readable media of claim 12, wherein the first user interface includes step-by-step instructions for creating the database schema.

16. The one or more non-transitory computer-readable media of claim 12, wherein retrieving the data from the non-relational database includes retrieving data from a plurality of data tables.

* * * * *